US009322600B2

(12) United States Patent
Hebert (10) Patent No.: US 9,322,600 B2
(45) Date of Patent: Apr. 26, 2016

(54) THERMOSYPHON HEAT RECOVERY (75) Inventor: Thomas H. Hebert, Lutz, FL (US)

(73) Assignee: Olive Tree Patents 1 LLC, Lutz, FL (US)

( * ) Notice: Subject to any disclaimer, the term of this patent is extended or adjusted under 35 U.S.C. 154(b) by 955 days.

(21) Appl. No.: 13/423,929

(22) Filed: Mar. 19, 2012

(65) Prior Publication Data

US 2012/0261102 A1 Oct. 18, 2012

Related U.S. Application Data

(60) Provisional application No. 61/453,561, filed on Mar. 17, 2011.

(51) Int. Cl.
| | |
|---|---|
| *F24H 3/00* | (2006.01) |
| *F28D 15/00* | (2006.01) |
| *F28D 7/00* | (2006.01) |
| *F28D 7/02* | (2006.01) |
| *F24H 4/04* | (2006.01) |
| *F24H 9/14* | (2006.01) |
| *F24H 9/20* | (2006.01) |
| *F24D 19/10* | (2006.01) |
| *F28D 20/00* | (2006.01) |
| *F24D 17/02* | (2006.01) |

(52) U.S. Cl.
CPC ............ *F28D 15/00* (2013.01); *F24D 19/1054* (2013.01); *F24H 4/04* (2013.01); *F24H 9/142* (2013.01); *F24H 9/2007* (2013.01); *F28D 7/0016* (2013.01); *F28D 7/022* (2013.01); *F24D 17/02* (2013.01); *F28D 20/0039* (2013.01); *Y02B 30/52* (2013.01); *Y10T 29/4935* (2015.01)

(58) Field of Classification Search
CPC ...... F28D 15/00; F28D 7/022; F28D 20/0039; F24H 4/04; F24H 9/2007; F24D 19/1054
USPC .......................... 165/47, 129; 62/238.1, 324.1
See application file for complete search history.

(56) References Cited

U.S. PATENT DOCUMENTS

| | | |
|---|---|---|
| 4,293,323 A | 10/1981 | Cohen |
| 4,330,309 A | 5/1982 | Robinson, Jr. |
| 4,350,024 A | 9/1982 | Moll |
| 4,351,159 A | 9/1982 | Schumacher |
| 4,356,706 A | 11/1982 | Baumgarten |
| 4,386,500 A | 6/1983 | Sigafoose |
| 4,441,902 A | 4/1984 | Jardine |

(Continued)

*Primary Examiner* — Marc Norman
*Assistant Examiner* — Jon T Schermerhorn
(74) *Attorney, Agent, or Firm* — Christopher Paradies; Paradies Law P.A.

(57) ABSTRACT

A thermosyphonic heat recovery unit for thermosyphonic heat transfer of heat from a hotter first fluid to a cooler second fluid comprising a heat exchanger including a first fluid conduit and a second fluid conduit, optimized means for connecting fluids to the two conduits to optimize heat transfer and fluid flow, a pressurized cold fluid input and hot fluid output, whereby the second fluid thermosyphonically flows through said second conduit as the first fluid flows through said first conduit. Said system having an optimized heat exchanger tube-on tube spirally wound, with wind direction to take advantage of the Coriolus force effect, for optimized refrigerant and other fluid turbulence and therefore optimized heat transfer, and optimum location of said heat exchanger and sizes of connecting tubes to minimize refrigerant friction related pressure loss, and to optimize heat transfer, refrigerant flow and thermosyphonic second fluid flow through said heat exchanger.

23 Claims, 8 Drawing Sheets

(56) References Cited

U.S. PATENT DOCUMENTS

| | | | |
|---|---|---|---|
| 4,449,377 A * | 5/1984 | Draper | 62/324.1 |
| 4,599,870 A * | 7/1986 | Hebert et al. | 62/238.6 |
| 5,157,937 A | 10/1992 | Choung et al. | |
| 5,417,201 A | 5/1995 | Thomas et al. | |
| 5,689,966 A | 11/1997 | Zess et al. | |
| 5,897,338 A | 4/1999 | Kaldenberg | |
| 5,970,728 A | 10/1999 | Hebert | |
| 5,993,223 A | 11/1999 | Rehhoff | |
| 6,007,455 A | 12/1999 | Steeby | |
| 6,070,423 A | 6/2000 | Hebert | |
| 6,116,048 A | 9/2000 | Hebert | |
| 6,155,119 A | 12/2000 | Normann et al. | |
| 6,237,359 B1 | 5/2001 | Hebert | |
| 6,300,169 B1 | 10/2001 | Weiblen et al. | |
| 6,311,561 B1 | 11/2001 | Bang et al. | |
| 6,351,390 B1 | 2/2002 | Mayer et al. | |
| 6,857,285 B2 | 2/2005 | Hebert | |
| 6,871,546 B2 | 3/2005 | Scheurich et al. | |
| 6,874,694 B2 | 4/2005 | Saitoh et al. | |
| 7,055,339 B2 * | 6/2006 | Hebert | 62/238.1 |
| 7,234,646 B2 | 6/2007 | Saitoh et al. | |
| 7,363,819 B2 | 4/2008 | Mast et al. | |
| 7,726,151 B2 | 6/2010 | Manole | |
| 7,726,263 B2 | 6/2010 | Ben-Ishai | |
| 2005/0018670 A1 | 1/2005 | Shigematsu et al. | |
| 2005/0269067 A1 * | 12/2005 | Cowans et al. | 165/157 |

\* cited by examiner

ZEROENERGY™ Water Heating System
Refrigerant Line Sizing Charts

Recommended Refrigerant O.D. Line Size(33) for Tonnage on Residen-

| DISTANCE IN FEET | NOMINAL EQUIPMENT SIZE (TONNAGE) | | | | | | |
|---|---|---|---|---|---|---|---|
| | 1½ | 2 | 2½ | 3 | 3½ | 4 | 5 |
| 10 | 1/2" | 5/8" | 5/8" | 5/8" | 5/8" | 5/8" | 3/4" |
| 20 | 1/2" | 5/8" | 5/8" | 5/8" | 5/8" | 3/4" | 3/4" |
| 30 | 1/2" | 5/8" | 5/8" | 5/8" | 3/4" | 3/4" | 3/4" |
| 40 | 5/8" | 5/8" | 5/8" | 3/4" | 3/4" | 3/4" | 7/8" |
| 50 | 5/8" | 5/8" | 3/4" | 3/4" | 3/4" | 7/8" | 7/8" |
| 60 | 5/8" | 3/4" | 3/4" | 3/4" | 7/8" | 7/8" | 7/8" |
| 70 | 5/8" | 3/4" | 3/4" | 3/4" | 7/8" | 7/8" | 1-1/8" |
| 80 | 5/8" | 3/4" | 3/4" | 3/4" | 7/8" | 7/8" | 1-1/8" |
| 90 | 5/8" | 3/4" | 3/4" | 7/8" | 7/8" | 7/8" | 1-1/8" |
| 100 | 5/8" | 3/4" | 3/4" | 7/8" | 7/8" | 7/8" | 1-1/8" |

(NOTE: All distances over 100' require an oil trap)
Note: All 2 speed or tandem compressor units must have vertical (upward flow) lines sized for flow velocity no less than 1,000 fpm for lowest compressor size. Example a 5 ton system that can operate at 2 1/2 tons of capacity would require all vertical (upward flow) line sizes to be no larger than 5/8"O.D. Copper tubing.
Recommended Refrigerant O.D. Line Size for Tonnage on Commercial Systems Capacity! (Refrigerant Pressure Loss, PSIG). For All EPA Approved Refrigerants.

| DISTANCE IN FEET | NOMINAL EQUIPMENT SIZE (TONNAGE) | | | | | | |
|---|---|---|---|---|---|---|---|
| | 5 | 6 | 7.5 | 8.5 | 10 | 12.5 | 15 |
| 10 | 3/4" | 3/4" | 3/4" | 3/4" | 7/8" | 7/8" | 1-1/8" |
| 20 | 3/4" | 3/4" | 7/8" | 7/8" | 7/8" | 1-1/8" | 1-1/8" |
| 30 | 3/4" | 7/8" | 7/8" | 7/8" | 1-1/8" | 1-1/8" | 1-1/8" |
| 40 | 7/8" | 7/8" | 1-1/8" | 1-1/8" | 1-1/8" | 1-1/8" | 1-3/8" |
| 50 | 7/8" | 7/8" | 1-1/8" | 1-1/8" | 1-1/8" | 1-3/8" | 1-3/8" |
| 60 | 7/8" | 1-1/8" | 1-1/8" | 1-1/8" | 1-1/8" | 1-3/8" | 1-3/8" |
| 70 | 1-1/8" | 1-1/8" | 1-1/8" | 1-1/8" | 1-1/8" | 1-3/8" | 1-3/8" |
| 80 | 1-1/8" | 1-1/8" | 1-1/8" | 1-1/8" | 1-1/8" | 1-3/8" | 1-3/8" |
| 90 | 1-1/8" | 1-1/8" | 1-1/8" | 1-1/8" | 1-3/8" | 1-3/8" | 1-3/8" |
| 100 | 1-1/8" | 1-1/8" | 1-1/8" | 1-1/8" | 1-3/8" | 1-3/8" | 1-3/8" |

NOTE: Shaded line sizes use next smaller size tubing in column for vertical risers.
Example: A 3-ton system has a total development length of 100' (one way); use 7/8" tubing for the horizontal runs and 3/4" tubing for the vertical rises.
NOTE: Refrigeration Systems must size refrigerant lines based on mass flow rather than system tonnages. Please call PES for proper line sizing at 866-922-ZERO.

FIG 6a.

ZEROENERGY™ Water Heating System
Refrigerant Line Sizing Charts

Recommended Refrigerant O.D. Line Size (33) for Tonnage on Residential & Commercial Systems.   Note: Sizes shown for R-410a

| Distance in Feet | Nominal Equipment Size (Tonnage) | | | | | | |
|---|---|---|---|---|---|---|---|
| | 1-1/2 | 2 | 2 1/2 | 3 | 3 1/2 | 4 | 5 |
| 10 | 3/8" | 1/2" | 1/2" | 1/2" | 1/2" | 1/2" | 5/8" |
| 20 | 3/8" | 1/2" | 1/2" | 1/2" | 1/2" | 5/8" | 5/8" |
| 30 | 3/8" | 1/2" | 1/2" | 1/2" | 5/8" | 5/8" | 5/8" |
| 40 | 1/2" | 1/2" | 1/2" | 5/8" | 5/8" | 5/8" | 3/4" |
| 50 | 1/2" | 1/2" | 5/8" | 5/8" | 5/8" | 3/4" | 3/4" |
| 60 | 1/2" | 5/8" | 5/8" | 5/8" | 5/8" | 3/4" | 3/4" |
| 70 | 1/2" | 5/8" | 5/8" | 5/8" | 3/4" | 3/4" | 5/8" |
| 80 | 1/2" | 5/8" | 5/8" | 5/8" | 3/4" | 3/4" | 7/8" |
| 90 | 1/2" | 5/8" | 5/8" | 3/4" | 3/4" | 3/4" | 7/8" |
| 100 | 1/2" | 5/8" | 5/8" | 3/4" | 3/4" | 3/4" | 7/8" |

(NOTE: All distances over 100' require an oil trap)
Note: All 2 speed or tandem compressor units must have vertical (upward flow) lines sized for flow velocity no less than 1,000 fpm for lowest compressor size. Example a 5 ton system that can operate at 2 1/2 tons of capacity would require all vertical (upward flow) line sizes to be no larger than 1/2"O.D. Copper tubing.

Recommended Refrigerant O.D. Line Size for Tonnage on Commercial Systems Capacity/ (Refrigerant Pressure Loss, PSIG).

| Distance in Feet | Nominal Equipment Size (Tonnage) | | | | | | |
|---|---|---|---|---|---|---|---|
| | 5 | 6 | 7 1/2 | 8.5 | 10 | 12.5 | 15 |
| 10 | 5/8" | 5/8" | 5/8" | 5/8" | 3/4" | 3/4" | 7/8" |
| 20 | 5/8" | 5/8" | 3/4" | 3/4" | 3/4" | 7/8" | 7/8" |
| 30 | 5/8" | 3/4" | 3/4" | 3/4" | 7/8" | 7/8" | 7/8" |
| 40 | 3/4" | 3/4" | 7/8" | 7/8" | 7/8" | 7/8" | 1 1/8" |
| 50 | 3/4" | 3/4" | 7/8" | 7/8" | 7/8" | 1 1/8" | 1 1/8" |
| 60 | 3/4" | 7/8" | 7/8" | 7/8" | 7/8" | 1 1/8" | 1 1/8" |
| 70 | 7/8" | 7/8" | 7/8" | 7/8" | 7/8" | 1 1/8" | 1 1/8" |
| 80 | 7/8" | 7/8" | 7/8" | 7/8" | 7/8" | 1 1/8" | 1 1/8" |
| 90 | 7/8" | 7/8" | 7/8" | 7/8" | 1 1/8" | 1 1/8" | 1 1/8" |
| 100 | 7/8" | 7/8" | 7/8" | 7/8" | 1 1/8" | 1 1/8" | 1 1/8" |

NOTE: Shaded line sizes use next smaller size tubing in column for vertical risers.
Example: A 3-ton system has a total development length of 100' (one way); use 3/4" tubing for the horizontal runs and 5/8" tubing for the vertical rises.
NOTE: Refrigeration Systems must size refrigerant lines based on mass flow rather than system tonnages. Please call PES for proper line sizing at 866-922-ZERO.

THERMOSYPHON HEAT RECOVERY

CROSS-REFERENCE TO RELATED INVENTIONS

This application claims the benefit of provisional application No. 61/453,561, filed Mar. 17, 2011, the disclosure of which is hereby incorporated by reference herein.

BACKGROUND OF THE INVENTION

1. Field of the Invention

This invention relates to heat recovery units. More particularly, this invention relates to heat recovery units that operate thermosyphonically to flow water in a heat exchanging relationship with a source of heat.

2. Description of the Prior Art

Presently there exist many types of heat recovery units designed to operate in combination with a vapor compression heat transfer system such as a heat pump or air conditioner. Basically, heat recovery units operate as a precooler to desuperheat the hot refrigerant gas being discharged by the compressor of the system, and transfer such heat to a fluid such as water. In some applications, the precooler heat exchanger is positioned within a large tank such that the fluid contained therein becomes heated during operation of the compressor. In other applications, a continuous supply of fluid such as water is forced through the precooler heat exchanger to desuperheat the refrigerant passing therethrough. In some, the water flows through a heat exchanger thermosyphonically, but with limited heat exchange due to inadequate consideration of the requirements for optimized heat transfer and efficient fluid flow.

The state of the art is exemplified in my prior U.S. Pat. Nos. 4,599,870 and 7,055,339, and the following patents (and patent application) that were cited in either of them during their respective prosecutions or that have cited either of them after their respective issuances, the disclosures of each of which are each hereby incorporated by reference herein:

| | | |
|---|---|---|
| 5,689,966 | 6,857,285 | 6,311,561 |
| 4,293,323 | 5,897,338 | 6,871,546 |
| 4,330,309 | 5,970,728 | 6,874,694 |
| 4,350,024 | 5,993,223 | 6,351,390 |
| 4,351,159 | 6,007,455 | 5,417,201 |
| 4,356,706 | 6,070,423 | 7,234,646 |
| 4,386,500 | 6,116,048 | 7,363,819 |
| 4,441,902 | 6,155,119 | 7,726,151 |
| 4,449,377 | 6,237,359 | 7,726,263 |
| 6,300,169 | 5,157,937 | 2005/0186703 |

A major disadvantage to the former types of precoolers is their tendency to uncontrollably heat the fluid and, in the case of water, may produce steam or water that is too hot for use. In the latter applications, a mechanical pump is necessary in order to circulate the fluid through the precooler during operation of the compressor and controls are required to control the operation of the pump to insure adequate temperature control. This necessarily precludes efficient production of hot fluid, in that some energy must be expended to drive the pump mechanism, and some production of heat is lost due to pump controls, limiting operation time of the pump.

Therefore, it is an object of this invention to provide an apparatus and a method which overcomes the aforementioned inadequacies of the prior art devices and provides an improvement which is a significant contribution to the advancement of heat recovery art.

Another object of this invention is to provide a heat recovery unit which optimizes the transfer of heat from a first fluid to a second fluid, by providing a heat exchanger that is a tube-on tube heat exchanger that is wound in a direction that takes advantage of the Coriolis force effect for optimum flow rate, and is wound in a tight radius (diameter) to provide optimized turbulence for optimum heat transfer.

Another object of this invention is to provide a heat recovery unit that minimizes the friction loss pressure drop through the heat exchanger by sizing the refrigerant line size used in the heat exchanger for minimum friction related pressure loss for the maximum sized HVACR system the heat exchanger is attached to, while maintaining an adequate refrigerant velocity to provide for oil flow through the heat exchanger.

Another object of this invention is to provide the optimized location of the heat exchanger of this heat recovery unit that produces an optimized heat transfer, by providing the optimum height of the secondary fluid entry into the heat exchanger above the exit of the secondary fluid from the fluid exit point at the bottom of the secondary fluid storage tank.

Another object of this invention is to provide a heat recovery unit which is operable to transfer heat from a first fluid to a second fluid without the use of mechanical fluid pumps or the like.

Another object of this invention is to provide a heat recovery unit which is adaptable to recover the superheat from a vapor compression heat transfer system such as a heat pump or air conditioner.

Another object of this invention is to provide optimized connector tubing sizes to optimize flow of the refrigerant through said connectors, by sizing the connector tubing to minimize friction related pressure loss while providing a size adequate to insure minimum required refrigerant velocity to maintain proper oil flow through the refrigeration system.

Another object of this invention is to provide the installer with an engineered refrigerant line sizing chart to ensure that the line sizes and heat exchanger installation will produce the least amount of friction pressure loss possible while maintaining adequate refrigerant velocity to maintain good oil return to the compressor.

Another object of this invention is to provide optimized connector tubing sizes to optimize the secondary fluid flow through said connectors, by sizing the connector tubing to maximize the flow through said connectors.

Another object of this invention is to provide a heat recovery unit which is readily adaptable to conventional hot water tanks without alteration of the hot water tank other than removing and/or replacing existing fittings and connectors.

Another object of this invention is to provide a heat recovery unit which includes an anti-scald mixing valve arrangement to limit the temperature of the water being discharged from the tank for subsequent use.

Another object of this invention is to provide a heat recovery unit in which the anti-scald mixing valve assembly, the properly sized fluid (being heated) connectors, the optimizing location mounting component, and the heat exchanger unit are packageable as a kit to be sold to distributors for retail installation.

An additional object of this invention is to provide a method of locating the heat exchanger unit at the optimum location to provide for optimized heat transfer and water (fluid) flow through said heat exchanger.

Another object of this invention is to provide a method for accomplishing the above stated objects of the apparatus of the present invention.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises an apparatus and method for transferring heat efficiently with optimized heat transfer, from a first fluid to a second fluid without utilizing any type of mechanical fluid pump or the like, all without adversely effecting the refrigerant pressure drop and/or oil flow through said heat exchanger and connector tubing. More particularly, the apparatus and method of the invention is accomplished by circulating a hotter first fluid in thermal contact with a cooler second fluid in a heat exchanger such that the cooler second fluid is thermosyphonically drawn through the spirally wound counterclockwise (north of equator, clockwise South of the equator) heat exchanger as the second fluid absorbs heat from the first fluid. This unique thermosyphoning and Coriolis effect pumping action is particularly adaptable to heat recovery units designed to be used in combination with vapor compression heat transfer units such as refrigeration units, heat pumps and air conditioners.

The apparatus of the invention is particularly designed to be easily fitted to a conventional hot water heater. Specifically, the apparatus of the invention (the heat exchanger) comprises a tube-on-tube heat exchanger which is configured to be wound counterclockwise upward (north of equator applications, and clockwise upward for south of the equator applications) in a relatively tight diameter (6") to provide for good refrigerant turbulence, clipped in solder for heat transfer, of a tubing size designed to minimize friction related pressure loss, then placed in a cabinet of adequate size to contain said heat exchanger to be located optimally in relation to the water outlet from the hot water storage tank and the heated water inlet to the hot water tank. The input of the secondary fluid conduit of the heat exchanger is then easily fitted to the existing hose bib (bottom cold water outlet of the water storage tank) by means of a flexible water heater hose of an inside diameter of a size designed to minimize friction loss and maximize fluid flow and the output of the fluid conduit of the secondary fluid of the heat exchanger is then easily fitted with a hot water rated hose of an inside diameter size designed to minimize friction loss and maximize fluid flow from the outlet of the heat exchanger to a new boiler drain attached by means of an anti-siphon tee to the hot water discharge line of the water heater at the top of the tank. The apparatus further includes an anti-scald valve assembly which is easily incorporated within the cold and hot water supply lines to the tank. The anti-scald valve assembly limits the temperature of the heated water being discharged from the tank via the hot water supply line.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 6a is refrigerant pipe sizing chart that has been optimized for minimum friction loss and adequate refrigerant velocity for oil return for R-22, R-134a & R407c.

FIG. 6b is refrigerant pipe sizing chart that has been optimized for minimum friction loss and adequate refrigerant velocity for oil return for R-410a.

Similar reference characters refer to similar parts throughout the several views of the drawings.

DETAILED DESCRIPTION OF THE PREFERRED EMBODIMENT

Figure 1:
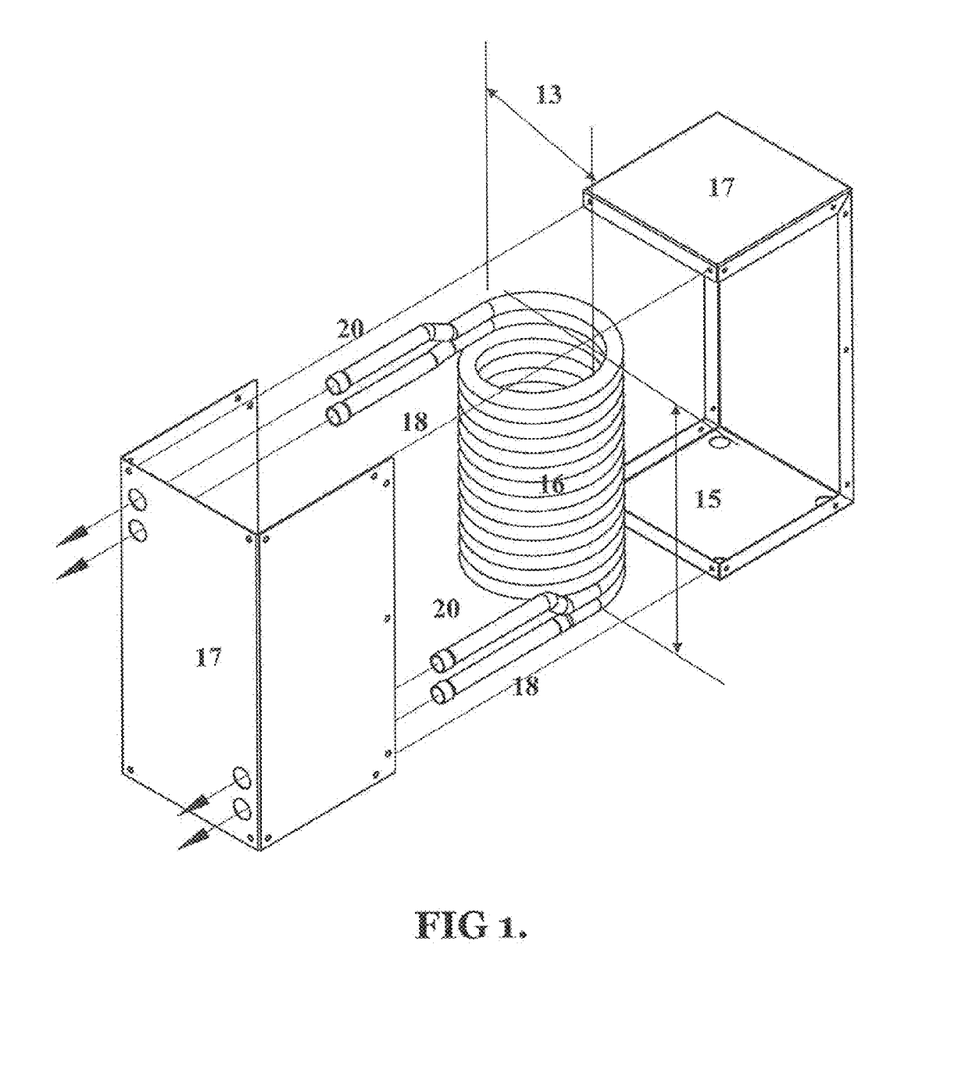
FIG. 1 is a schematic representation of the apparatus of the invention.

FIG. 1 is a schematic representation generally illustrating the structure and composition of the apparatus only of the heat exchanger and cabinet of the invention. The apparatus of the heat exchanger (16) comprises a first conduit (18) through which the first fluid (refrigerant) flows in heat exchange relationship with a second conduit (20) through which the second fluid flows. The first conduit (18) and the second conduit (20) are both sized based on the maximum HVACR tonnage or capacity intended for application to the heat exchanger for a maximum allowable friction related pressure drop of 4 psi for the total length of conduit through the heat exchanger. The heat exchanger is wound in a tight spiral at the minimum possible diameter (13) possible for manufacture, to maximize turbulence in the fluid flow. The total length of the heat exchanger conduits (15) is based on that diameter and the maximum allowable height of the heat exchanger based on considerations of possible water storage tank heights for optimum possible hot water production from the heat exchanger. Also illustrated is the two piece cabinet required to house the heat exchanger (17).

Figure 2:
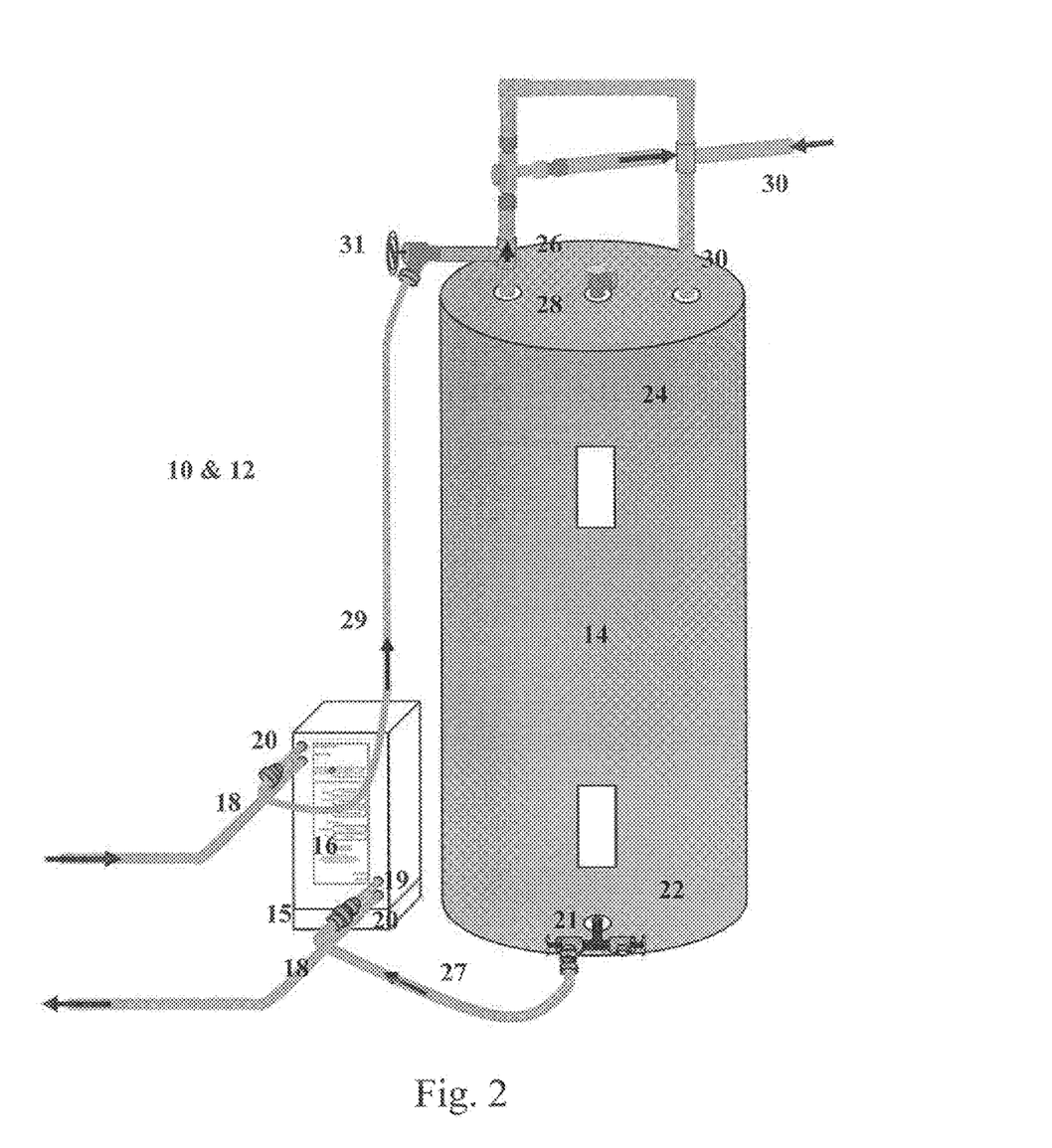
FIG. 2 is a schematic representation of the apparatus and method of the invention.

FIG. 2 is a schematic representation generally illustrating the apparatus (10) and method (12) of the invention. Basically, the method (12) of the invention comprises the steps of passing a hot fluid such as a gas or a liquid in thermal exchanging relationship with another fluid flowing to and from a storage tank (14) or the like. During operation, the hotter first fluid, being in thermal contact with the cooler second fluid, creates a thermosyphonic effect which draws the cooler second fluid from the lower region of the tank in a heat-exchanging relationship with the hotter first fluid, and then returns the second fluid to the upper region of the tank (14). The rate in which the thermosyphonic effect takes place, gradually decreases as the temperature of the second fluid within the tank (14) increases. Eventually, the temperature of the second fluid in the tank (14) will approximately equal the temperature of the first fluid at which time the thermosyphonic flow of the second fluid terminates.

The apparatus (10) of the invention basically comprises a heat exchanger (16) which thermally connects a first conduit (18) through which the first fluid flows in a heat exchanging relationship with a second conduit (20) through which the second fluid flows. The input and output of the second conduit (20) are operatively connected in fluid communication with the lower and upper regions (22) and (24), respectively, of the tank (14) to define a closed loop circulatory path. As shown, the output of conduit (20) may be connected by a fluid connector (29) to the new boiler drain (31) and then to a tee-fitting (26) to the hot water supply (28) of the tank.

Essentially, with such an arrangement, cooler water flows into the tank (14) via the cold water supply (30) and settles in the lower region (22) of the tank (14). As the hotter first fluid flows through the heat exchanger (16) to create the thermosyphonic effect, the second fluid contained within the tank (14) circulates from the bottom of the tank, out of the bottom boiler drain (21), through the fluid connector (27) to the conduit (20) into the heat exchanger (16) and causes stratification within the tank (14). At any time, heated secondary fluid may be removed from the tank (14) via the hot fluid supply (28). If the thermosyphonic effect is occurring during the discharge of the heated second fluid from the heat exchanger (16), the output of conduit (20) will flow directly into the hot fluid supply (28) and be consumed.

It should be appreciated that the apparatus (10) and method (12) of the invention operate to heat fluid contained within the tank (14) without the necessity of any mechanical pumping action. Further, it should also be appreciated that the closed loop conduit (20) remains pressurized at the same pressure existing at the supply conduits (28) and (30). This assures that the apparatus (10) of the invention can be connected to existing tanks (14) without adversely affecting fluid pressures or the like. By mounting the inlet (19) of the secondary fluid from the water storage tank above (1" minimum & 2" maximum) the outlet (21) of the water storage tank, the fluid flow through the heat exchanger is optimized and will not tend to flow backwards, and the heat exchange will be maximized for the longest possible cycle. Further, by insuring an upward flow from the outlet of the water storage tank to the inlet for the secondary fluid to the heat exchanger, there will be no tendency for scale deposits or other material in the bottom of the water storage tank to migrate into the heat exchanger.

Figure 3:
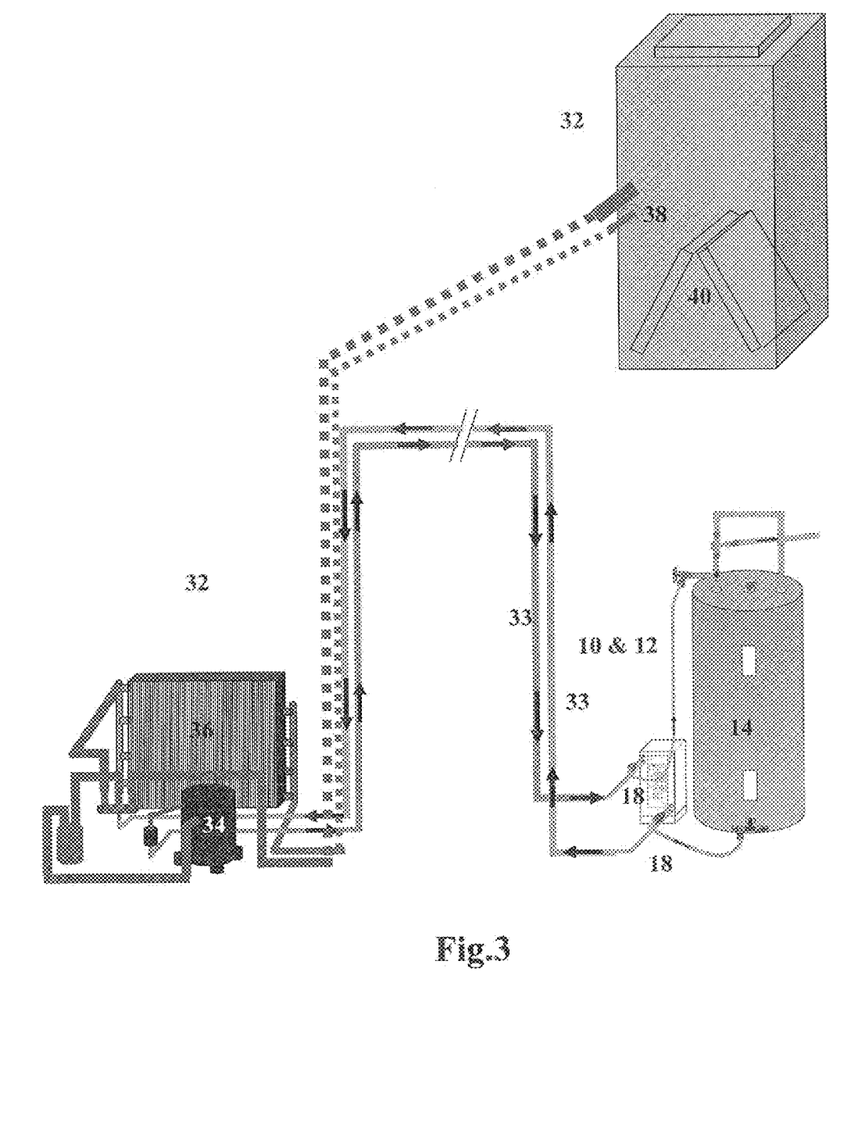
FIG. 3 is a schematic representation of the first embodiment of the apparatus and method of the invention designed to operate in combination with a vapor cycle heat transfer system.

FIG. 3 is a schematic representation which illustrates the apparatus (10) and method (12) of the invention connected and operating in conjunction with a conventional vapor compression heat transfer system (32) such as a heat pump or air conditioner. Reduced to its essential components, conventional heat transfer systems (32) comprise a compressor (34), condenser (36), throttling device (38) and evaporator (40) which are connected in serial fluid communication. During operation, the compressor (34) compresses the refrigerant contained within the circuit from a saturated-vapor state to a superheated vapor state, thereby increasing the temperature, enthalpy and pressure of the refrigerant. The refrigerant then flows through the condenser (36) which condenses the refrigerant at a substantially constant temperature to a saturated liquid state. The throttling device (38) reduces the pressure of the refrigerant thereby causing the refrigerant to change to a mixed liquid-vapor state. The refrigerant then flows through the evaporator (40) which causes the refrigerant to return at a constant pressure to its saturated-vapor state, thereby completing the thermal transfer cycle of the system (32).

In the preferred embodiment of the apparatus (10) of the invention, conduit (18) of the heat exchanger is connected in serial fluid communication by means of a refrigerant line (33) with the refrigerant circuit of the system (32) and connected to the refrigerant circuit at the discharge of the compressor (34) and a similar refrigerant line (33) connects the outlet of the heat exchanger conduit (18) and the inlet to the condenser (36). During the operation of the heat transfer system (32), the hot refrigerant gas is discharged from the compressor (34) at a superheated vapor state and flows through the connecting refrigerant line (33) to conduit 18 of the heat exchanger (16) and then back to the condenser (36) of the system (32) through a refrigerant line (33) tied to the outlet of the heat exchanger conduit (18). With the second fluid contained within the conduit (20) and the tank (14), the second fluid will partially desuperheat the hot refrigerant gas as it flows through the heat exchanger (16).

Simultaneously, a thermosyphonic effect will be created within the heat exchanger (16), such that the second fluid is caused to circulate through the closed loop conduit (20) in the manner as described above.

Figure 4:
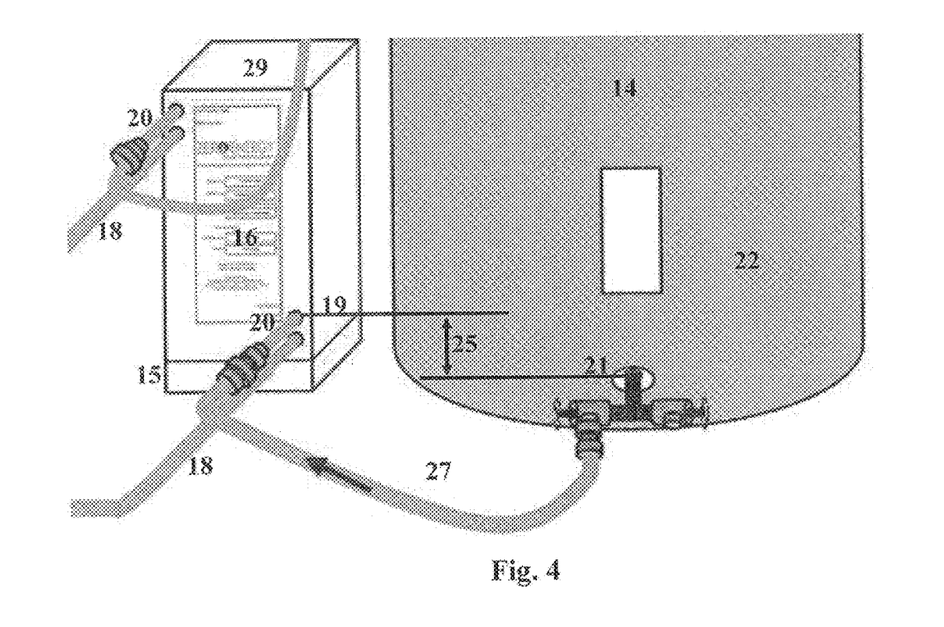
FIG. 4 is a schematic representation of the primary embodiment of the apparatus and method designed to illustrate the requirements for optimizing the fluid flow through the heat exchanger and connectors to the hot water storage tank.

FIG. 4 is a schematic representation of the apparatus (10) and method (12) of the invention where the fluid flow through the system is optimized by locating the heat exchanger (16) at the optimum height in relation to the water heater tank bottom outlet (21) by means of a Styrofoam (or other material) support block (15) (or anchored to the wall) so that the optimized water line size connection to the inlet to the heat exchanger (19) has a minimum rise of 1" and a maximum rise of 2" (25). The fluid line connector (water line) size has a minimum I.D. of V ½ (27) for any size of refrigerant vapor compression heat transfer system up to 6 tons of system capacity and a proportionate water line size for sizes greater than 6 tons. The fluid flow is optimized into the top of the water heater storage tank through a water line sized for optimum fluid flow (29) which is attached to a new boiler drain (31) connected to the hot water outlet line of the water heater storage tank (28) by means of an "anti venturi" tee (26) which ties into the hot water outlet (28) from the water heater storage tank (14).

It should be noted that many of the newer water heaters have so-called heat traps at the hot water outlet (28) of the tank and these must be removed in order to insure proper thermosyphonic fluid flow through the tank and connections to the heat exchanger (16).

The foregoing has described the preferred embodiment of the apparatus (10) and method (12) of the invention. However, when the apparatus (10) of the invention is used in conjunction with a vapor cycle heat transfer system such as a heat pump or air conditioner, the temperature of the water contained within the tank (14) may increase beyond a safe temperature. A potentially dangerous situation may, therefore, exist in that (a) the consumer may inadvertently scald himself/herself when exposed to the excessive temperature of the fluid in the tank (14). In order to eliminate the potential that such a hazard may exist, the apparatus (10) of the invention further comprises a unique mixing arrangement (88) which limits the temperature of the water flowing into the hot water supply (96).

FIG. 4 is a schematic representation of the apparatus (10) and method (12) of the invention where the fluid flow through the system is optimized by locating the heat exchanger (16) at the optimum height in relation to the water heater tank bottom outlet (21) by means of a Styrofoam (or other material) support block (15) (or anchored to the wall) so that the optimized water line size connection to the inlet to the heat exchanger (19) has a minimum rise of 1" and a maximum rise of 2" (25).). The fluid line connector (water line) size has a minimum I.D. of ½" (27) for any size of refrigerant vapor compression heat transfer system up to 6 tons of system capacity and a proportionate water line size for sizes greater than 6 tons. The fluid flow is optimized into the top of the water heater storage tank through a water line sized for optimum fluid flow (29) which is attached to a new boiler drain (31) connected to the hot water outlet line of the water heater storage tank (28) by means of an "anti venturi" tee (26) which ties into the hot water outlet (28) from the water heater storage tank (14).

Figure 7:
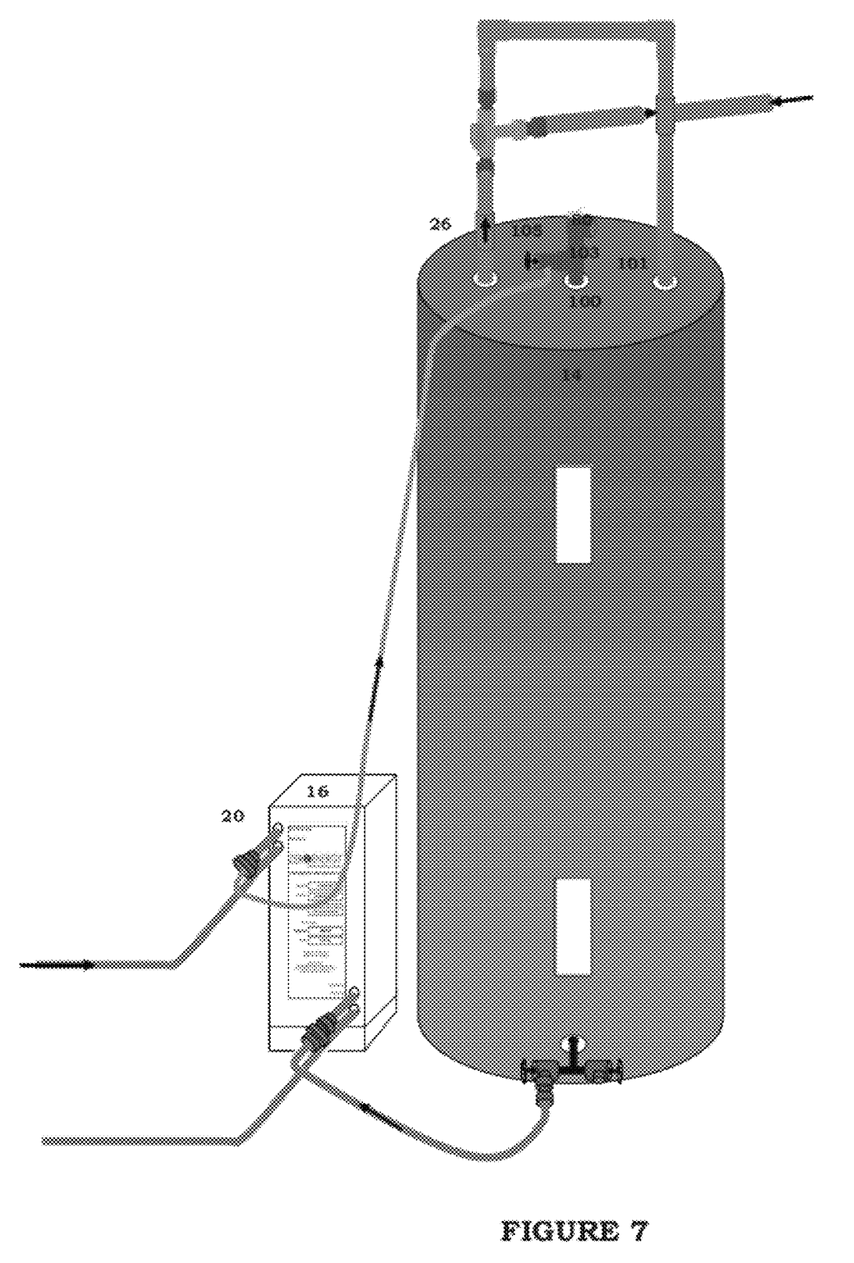
FIG. 7 illustrates the kit embodiment of the invention.

Surprisingly and unexpectedly, a kit containing a brass nipple (101) and a brass tee (103) fittings offers an alternative hot water connection. In this example, the hot water connection from the heat exchanger to the water heater tank may be made through a pop-off valve (80) location, i.e. the location of the temperature/pressure safety valve seat or P/T valve seat (100). For example, the process for installation is modified by first removing the pop-off valve (80) from the P/T valve seat (100) and installing the brass nipple (101) and brass tee (103) of the kit onto the tank at the former location of the P/T valve (80), as illustrated in FIG. 7, for example. The T/P valve is reconnected in the top connection of the brass tee of the kit, and a boiler drain is installed in the side connection of the brass tee. The outlet of the heat exchanger is connected to the boiler drain in the side of the brass tee. This alternative example eliminates the need for the anti-Venturi tee, but the Anti-Scald valve is retained as installed, as before, during the process, for safety.

Referring to FIG. 4, the mixing arrangement (88) comprises an adjustable anti-scald valve (90) having a cold water input (92), a hot water input (94), and a tempered output (96). Preferably, such an anti-scald valve (90) comprises a valve similar to one sold under the trademark AM Series Thermostatic Mixing Valve by Honeywell International, Inc. of Golden Valley, Minn., Honeywell AM-1 Series. These types of mixing valves (90) are standardized to be adjustable within the ranges of 100-145 degrees. The cold water input to the anti-scald valve (92) is connected in fluid communication with the existing cold water supply (30) by means of a conduit (98). The hot water input to the anti-scald valve (94) is connected in fluid communication with the upper region (24) of the tank (14) through the anti-syphon tee fitting (26) and the hot water outlet (28) of the water heater storage tank. The pop-off valve (80) is left alone in this installation.

It should be appreciated that the mixing arrangement (88) including mixing (anti-scald) valve (90), and connections (92), (94), & (96) are typically sold as a kit along with the heat exchanger (16) to distributors for retail installation. Further, the unique mixing arrangement (88) takes advantages of all of the existing openings in the tank (14) thereby eliminating the need to create additional openings or close off existing openings in the tank (14) while still permitting the mixing arrangement (88) to be connected to the existing cold and hot water supply conduits (30) and (28), respectively.

Figure 5:
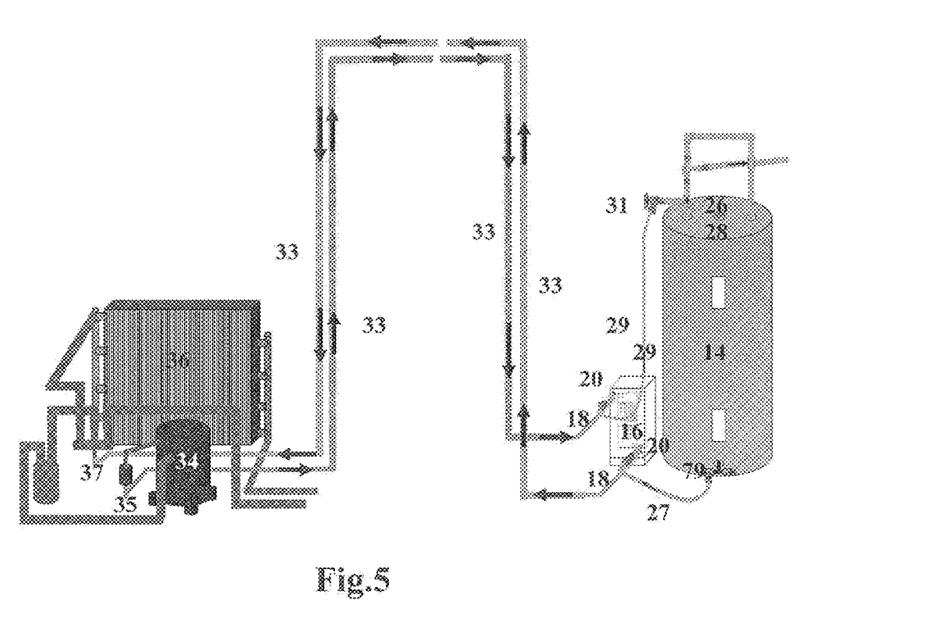
FIG. 5 is an isometric view of the preferred manner in which the apparatus of the invention is connected relative to a conventional hot water heater.

FIG. 5 is a detailed isometric view of the referred embodiment of the apparatus (10) and method (12) of the invention which is designed to be installed in conjunction with a conventional hot water heater (14). Specifically, the heat exchanger (16) of the apparatus (10) comprises a tube-on-tube heat exchanger (16) which is spirally wound with a relatively small diameter (6 inches diameter of ⅝" O.D. copper tubing for vapor compression refrigeration, heat pump or air conditioning sizes up to 6 tons per circuit) which is then dip soldered to provide good heat transfer utilizing the turbulence created by the tight spiral wound design and hemisphere related wind direction to take advantage of the so called Coriolus effect force, and then located in close proximity to the tank (14). The input and output of the refrigerant conduit (18) of the tube-on-tube heat exchanger (16) is connected in serial fluid communication with the output of the compressor (35) by means of properly sized refrigerant lines (33) and the input of the condenser (37) of the vapor pressure heat transfer system.

The input of the fluid conduit (20) of the tube-on-tube heat exchanger (16) is connected in fluid communication (2&) with the existing drain (72) of the tank (14) through the existing hose bib (74), or by removing the existing hose bib and attaching a nipple (76) and tee-fitting (78), installing 2 new hose bibs (79) and then connecting the fluid conduit (20) of the heat exchanger (16) by means of a properly sized flexible water heater connector (27) to the closest of the new boiler drains (79).

The output of fluid conduit (20) of the tube-on-tube heat exchanger (16) is connected in fluid communication with the upper region of the tank (14) by connecting the output of conduit (20) by means of a flexible stainless steel washer hose (minimum I.D. ½") (29) to the top of the tank by means of a new boiler drain (31) connected to the output of the water heater storage tank (28) through an anti-venturi tee fitting (26).

FIG. 6a is a detailed spread sheet illustrating the line sizes (33) required for systems that utilize R-22, R-134a. R-407C and most other refrigeration type applications, for various system tonnages and distances between the outdoor (condensing) section of a HVACR system and the hot water heater (distance being one way distance including any vertical rise or fall plus all horizontal length, to maintain minimum friction related pressure loss while providing adequate refrigerant velocity to maintain good oil flow.

FIG. 6b is a detailed spread sheet illustrating the line sizes (33) required for R-410a, for various system tonnages and distances between the outdoor (condensing) section of a HVACR system and the hot water heater (distance being one way distance including any vertical rise or fall plus all horizontal length, to maintain minimum friction related pressure loss while providing adequate refrigerant velocity to maintain good oil flow.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangements of parts may be resorted to without departing from the spirit of the invention.

Now that the invention has been described:

What is claimed is:

1. A thermosyphonic heat recovery kit for thermosyphonic heat transfer of heat from a hotter first fluid to a cooler second fluid, comprising:

a mixing valve for preventing scalding, the mixing valve comprising a fluid input for input of cooler fluid, a fluid input for input of warmer fluid and an output fluid such that, when the mixing valve is operably coupled in a thermosyphonic heat recovery unit, the mixing valve is capable of mixing cooler fluid and warmer fluid to prevent the output fluid from reaching scalding temperatures;

a tube-on-tube heat exchanger, comprising a tube-on-tube coil portion, the coil portion comprising:
 a first fluid conduit; and
 a second fluid conduit having a conduit diameter,
wherein the coil portion comprises a coil of the first fluid conduit and a coil of the second fluid conduit in thermal heat exchanging relationship with the coil of the first fluid conduit, such that a difference in temperature between a fluid passing through the first fluid conduit and a fluid in the second fluid conduit results in thermal heat transfer between the fluid passing through the coil of the first fluid conduit and the fluid in the coil of the second fluid conduit; and the coil portion of the tube-on-tube heat exchanger is wound in a counterclockwise upward direction for use in the Northern Hemisphere or a clockwise upward direction for use in the Southern Hemisphere; and the coil portion of the tube-on-tube heat exchanger has a coil diameter and a coil height;

the coil diameter of the coil portion is selected such that Coriolis forces acting on fluids passing through the coil of the second fluid conduit substantially improve the rate of fluid flow in the coil of the second fluid conduit, without substantially increasing the pressure drop in the coil of the second fluid conduit;

the coil height and the tube diameter of the second fluid conduit being selected such that heat transfer from fluid passing through the first fluid conduit to fluid in the second fluid conduit thermosyphonically pumps fluid through the second fluid conduit; and the second fluid conduit has a lower inlet and an upper outlet, wherein the lower inlet is coupled to a bottom of the coil portion and the upper outlet is coupled to a top of the coil portion;

and the kit includes a mechanism for adjusting position of the bottom of the coil portion within the tube-on-tube heat exchanger and the lower inlet such that the bottom of the coil portion and the lower inlet is capable of being raised at least one inch higher than an outlet of a tank to which the lower inlet is coupled.

2. The kit of claim 1, wherein the coil portion is wound in a counterclockwise upward direction.

3. The kit of claim 1, wherein the coil portion is wound in a clockwise upward direction.

4. The kit of claim 1, wherein the coil of the first fluid conduit and the coil of the second fluid conduit are soldered one to the other.

5. The kit of claim 1, wherein the first fluid conduit is dimensioned to reduce pressure drop through the first fluid conduit to less than six pounds per square inch.

6. The kit of claim 1, wherein the mechanism for adjusting position of the bottom of the coil portion within the tube-on-tube heat exchanger and the lower inlet is capable of being arranged such that the bottom of the coil portion and the lower inlet is capable of being positioned no greater than two inches higher than the outlet of the tank to which the lower inlet is coupled.

7. The kit of claim 6, wherein the mechanism comprises a support block having a thickness no greater than two inches.

8. The kit of claim 1, comprising an anti-Venturi tee fitting having a first end capable of being coupled to a hot water outlet of the tank, a second end capable of being coupled to the mixing valve, and a thermosyphon coupling capable of being coupled to the second fluid conduit, such that, when installed, water thermosyphonically pumped through the second fluid conduit is capable of exiting the first end of the anti-Venturi tee fitting and hot water from the tank is capable of exiting from the second end of the anti-Venturi tee fitting, but no fluid is capable of being directed from the second end to the thermosyphon coupling or the first end of the anti-Venturi fitting.

9. The kit of claim 1, comprising a brass tee fitting having a first end capable of being coupled to a P/T valve seat, and opposite end capable of being coupled to a pop-off valve and a thermosyphon coupling capable of being coupled to the second fluid conduit, such that, when installed, water thermosyphonically pumped through the second fluid conduit is capable of entering a top portion of the tank, while not interfering with the functioning of the pop-off valve.

10. The kit of claim 9, comprising an anti-Venturi tee fitting having a first end capable of being coupled to a hot water outlet of the tank, a second end capable of being coupled to the mixing valve, and a thermosyphon coupling capable of being coupled to the second fluid conduit, such that, when installed, water thermosyphonically pumped through the second fluid conduit is capable of exiting the first end of the anti-Venturi tee fitting and hot water from the tank is capable of exiting from the second end of the anti-Venturi tee fitting, but no fluid is capable of being directed from the second end to the thermosyphon coupling or the first end of the anti-Venturi fitting.

11. The kit of claim 10, wherein the mechanism for adjusting position of the bottom of the coil portion within the tube-on-tube heat exchanger and the lower inlet is capable of being arranged such that the bottom of the coil portion and the lower inlet is capable of being positioned no greater than two inches higher than the outlet of the tank to which the lower inlet is coupled.

12. The kit of claim 11, wherein the mechanism comprises a support block having a thickness no greater than two inches.

13. The kit of claim 12, wherein the support block comprises a foam material.

14. A method for installing a kit according to claim 1, wherein the method comprises:
 fluidically coupling the lower inlet of the second fluid conduit to an outlet of a hot water tank; and
 adjusting a position of the bottom of the coil portion within the tube-on-tube heat exchanger and the lower inlet of the second fluid conduit such that the bottom of the coil portion of the tube-on-tube heat exchanger and the lower inlet of the second fluid conduit are both raised at least one inch higher than the outlet of the hot water tank.

15. The method of claim 14, wherein the step of adjusting comprises:
 selecting a support block having a thickness such that the bottom of the coil portion of the tube-on-tube heat exchanger and the lower inlet of the second fluid conduit are both raised at least one inch higher than the outlet of the hot water tank.

16. The method of claim 14, wherein the step of adjusting comprises:
 selecting a support block having a thickness such that the bottom of the coil portion of the tube-on-tube heat exchanger and the lower inlet of the second fluid conduit are both raised at least one inch higher than the outlet of the hot water tank and no greater than two inches higher than the outlet of the hot water tank to which the lower inlet of the second fluid conduit is coupled.

17. The method of claim 14, comprising:

coupling one end of an anti-Venturi tee fitting to a hot water outlet of the tank and coupling a second end, opposite of the first end of the anti-Venturi tee fitting, to the mixing valve, and coupling a thermosyphon coupling of the anti-Venturi tee fitting to the second fluid conduit; and operating the tube-on-tube heat exchanger such that water thermosyphonically pumped through the second fluid conduit exits the first end of the anti-Venturi tee fitting, while hot water from the tank is capable of exiting from the second end of the anti-Venturi tee fitting, while preventing water from being directed from the second end to the thermosyphon coupling.

18. The method of claim 14, comprising:

Coupling the second fluid conduit to a PIT valve seat of the tank using a brass tee.

19. A thermoshyphon heat recovery device for thermosyphonic heat transfer of heat from a hotter first fluid to a cooler second fluid, comprising:

a mixing valve for preventing scalding, the mixing valve comprising a fluid input for input of cooler fluid, a fluid input for input of warmer fluid and an output fluid such that the mixing valve is capable of mixing cooler fluid and warmer fluid to prevent the output fluid from reaching scalding temperatures;

a tube-on-tube heat exchanger, comprising a tube-on-tube coil portion, the coil portion comprising:

a first fluid conduit; and a second fluid conduit having a conduit diameter, wherein the coil portion comprises a coil of the first fluid conduit and a coil of the second fluid conduit in thermal heat exchanging relationship with the coil of the first fluid conduit, such that a difference in temperature between a fluid passing through the first fluid conduit and a fluid in the second fluid conduit results in thermal heat transfer between the fluid passing through the coil of the first fluid conduit and the fluid in the coil of the second fluid conduit; and the coil portion of the tube-on-tube heat exchanger is wound in a counterclockwise upward direction for use in the Northern Hemisphere or a clockwise upward direction for use in the Southern Hemisphere; and the coil portion of the tube-on-tube heat exchanger has a coil diameter and a coil height;

the coil diameter of the coil portion is selected such that Coriolis forces acting on fluids passing through the coil of the second fluid conduit substantially improve the rate of fluid flow in the coil of the second fluid conduit, without substantially increasing the pressure drop in the coil of the second fluid conduit;

the coil height and the tube diameter of the second fluid conduit being selected such that heat transfer from fluid passing through the first fluid conduit to fluid in the second fluid conduit thermosyphonically pumps fluid through the second fluid conduit; and the second fluid conduit has a lower inlet and an upper outlet, wherein the lower inlet is coupled to a bottom of the coil portion and the upper outlet is coupled to a top of the coil portion; and a support block for adjusting position of the bottom of the coil portion within the tube-on-tube heat exchanger and the lower inlet such that the bottom of the coil portion and the lower inlet are raised at least one inch higher than an outlet of a tank to which the lower inlet is to be coupled.

20. The device of claim 19, wherein the coil of the first fluid conduit and the coil of the second fluid conduit are soldered one to the other.

21. The device of claim 19, wherein the first fluid conduit is dimensioned to reduce pressure drop through the first fluid conduit to less than six pounds per square inch.

22. The device of claim 19, wherein the thickness of the support block is selected such that the lower inlet is raised at least one inch and no greater than two inches higher than the outlet of the tank to which the lower inlet is coupled.

23. The kit of claim 22, wherein the support block has a thickness no greater than two inches.

* * * * *